(12) United States Patent
Zhijian

(10) Patent No.: US 10,931,138 B2
(45) Date of Patent: *Feb. 23, 2021

(54) SHEATH FOR USB CHARGER

(71) Applicant: Li Zhijian, Fujian (CN)

(72) Inventor: Li Zhijian, Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,059

(22) Filed: Apr. 2, 2020

(65) Prior Publication Data

US 2020/0287404 A1    Sep. 10, 2020

Related U.S. Application Data

(63) Continuation-in-part of application No. 16/388,994, filed on Apr. 19, 2019, which is a continuation of application No. 14/836,104, filed on Aug. 26, 2015, now Pat. No. 10,574,071.

(51) Int. Cl.
*H02J 7/34* (2006.01)
*H02J 7/00* (2006.01)

(52) U.S. Cl.
CPC ............ H02J 7/342 (2020.01); H02J 7/0042 (2013.01); *H02J 7/00* (2013.01)

(58) Field of Classification Search
CPC ...... H02J 7/0042; H02J 7/0044; H02J 7/0045; H02J 3/322; H02J 7/0013; H02J 7/0014; H02J 7/0016; H02J 7/0018; H02J 7/0019; H02J 7/0024; H02J 7/0025; H02J 7/00; H02J 7/0077; H02J 7/0085; H02J 7/0088;

(Continued)

(56) References Cited

U.S. PATENT DOCUMENTS

| 6,816,760 B1 | 11/2004 | Namaky |
| 6,870,089 B1 | 3/2005 | Gray |
| 7,914,306 B1 | 3/2011 | Blackwell |

(Continued)

FOREIGN PATENT DOCUMENTS

| KR | 101390704 | 4/2014 |
| KR | 2014132850 A | 11/2014 |

*Primary Examiner* — Drew A Dunn
*Assistant Examiner* — Sailesh Thapa
(74) *Attorney, Agent, or Firm* — Jennifer Meredith, Esq.; Meredith Attorneys, PLLC

(57) ABSTRACT

A sheath for convenient charging having a left side, a right side and a top side, a first closed end, a second open end and a surrounding bottom portion surrounding at least a portion of the sides and ends of the sheath. At least a portion of the sheath extends above an outer surface of a body, wherein the body has an inner surface, an outer surface and an opening between the inner surface and the outer surface. The sheath is at the opening and the sheath receives a female end of a USB cable having four sides, an operative end, a cord end and a cord. The operative end of the female end of the USB cable is retained in the second open end of the sheath and the cord end of the female end of the USB cable is retained in the first closed end of the sheath to provide the female end of the UBS cable in a flat position with the operative end of the female connector being uncovered and above the outer surface of the body and the cord of the female end goes through the opening between the inner surface and the outer surface and the surrounding bottom portion is attached to a portion of the body.

24 Claims, 26 Drawing Sheets

(58) Field of Classification Search
CPC .. H01M 10/425; H01M 2220/00; H01M 2/02;
H01M 2/1022
See application file for complete search history.

(56) References Cited

U.S. PATENT DOCUMENTS

| | | | |
|---|---|---|---|
| 1,013,016 A1 | 11/2018 | Zhijian | |
| 2002/0198031 A1 | 12/2002 | Holmes | |
| 2005/0140331 A1 | 6/2005 | McQuade | |
| 2007/0297149 A1 | 12/2007 | Richardson | |
| 2008/0011799 A1 | 1/2008 | Chang | |
| 2008/0125164 A1 | 5/2008 | Singh | |
| 2008/0210728 A1 | 9/2008 | Bihn | |
| 2009/0006677 A1 | 1/2009 | Rofougaran | |
| 2009/0061926 A1 | 3/2009 | Lee | |
| 2009/0224722 A1* | 9/2009 | Causey | A45C 15/00 320/101 |
| 2009/0276089 A1 | 11/2009 | Bartholomew | |
| 2011/0110514 A1 | 5/2011 | Gustavsson | |
| 2012/0262116 A1* | 10/2012 | Ferber | H02J 2207/40 320/111 |
| 2012/0262117 A1 | 10/2012 | Ferber | |
| 2012/0286718 A1 | 11/2012 | Richards | |
| 2012/0299528 A1 | 11/2012 | Scarmozzino | |
| 2013/0026726 A1 | 1/2013 | Thomas | |
| 2013/0162389 A1 | 6/2013 | Crucs | |
| 2013/0214931 A1 | 8/2013 | Chia | |
| 2013/0249673 A1 | 9/2013 | Ferrari | |
| 2014/0002239 A1 | 1/2014 | Rayner | |
| 2014/0061273 A1 | 3/2014 | Bullivant | |
| 2014/0171132 A1 | 6/2014 | Ziemianska | |
| 2014/0327401 A1 | 11/2014 | Pickens | |
| 2015/0296644 A1 | 10/2015 | Chin | |
| 2015/0318716 A1* | 11/2015 | Pickens | H02J 7/00 320/110 |
| 2015/0326044 A1* | 11/2015 | Ashley | H02J 7/342 320/103 |
| 2015/0359127 A1 | 12/2015 | Daoura | |
| 2015/0366333 A1* | 12/2015 | Zhijian | A45F 4/02 224/576 |
| 2016/0141904 A1 | 5/2016 | Zhijian | |
| 2017/0119121 A1 | 5/2017 | Munoz | |
| 2018/0152037 A1* | 5/2018 | Yu | H02J 7/342 |
| 2018/0198295 A1* | 7/2018 | Warney | A45C 5/03 |

* cited by examiner

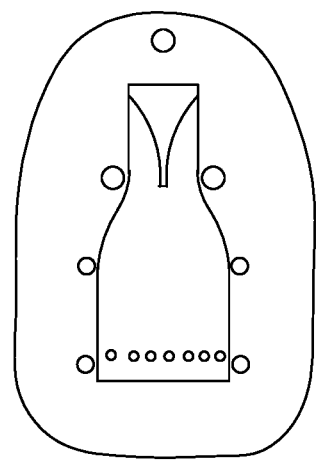
Fig. 11
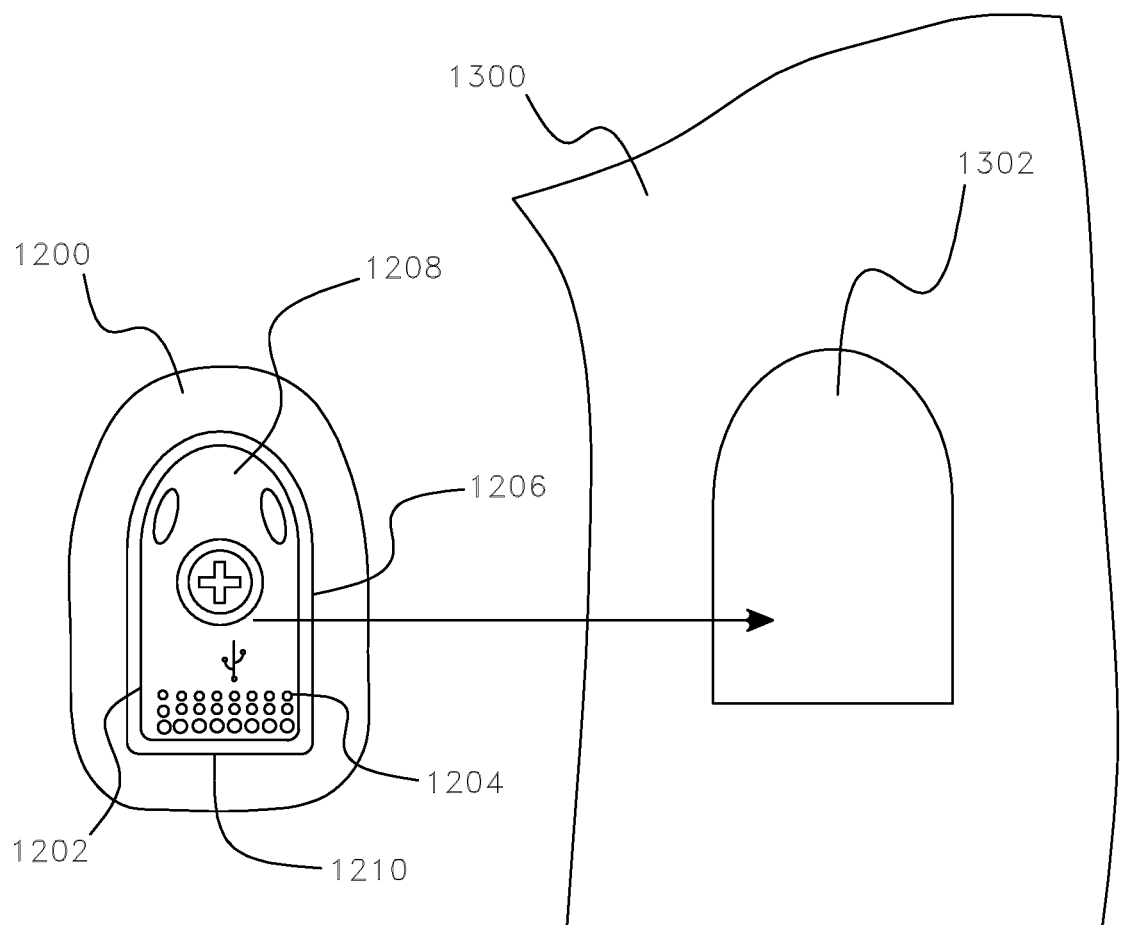
Fig. 12
Fig. 13

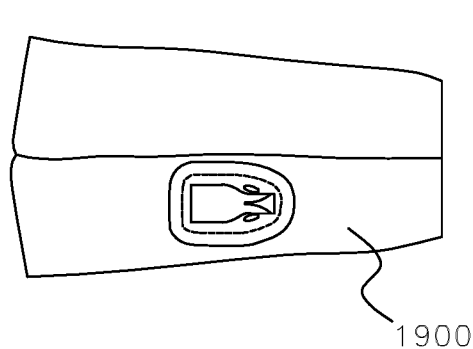
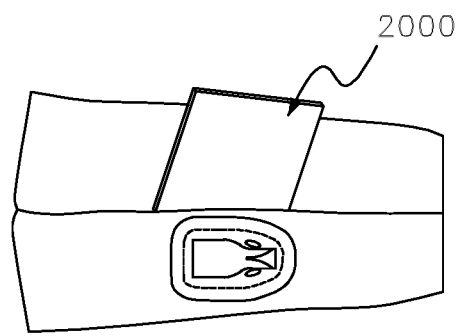
Fig. 19  Fig. 20
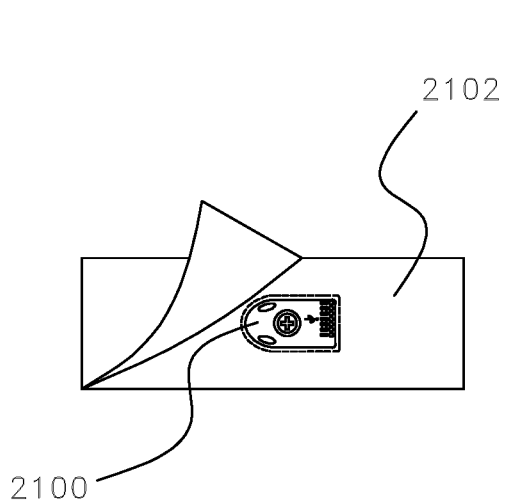
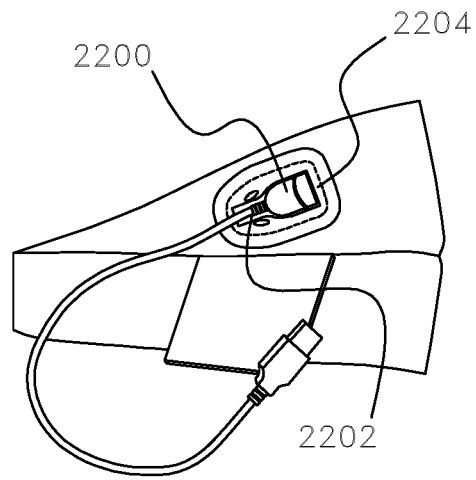
Fig. 21  Fig. 22

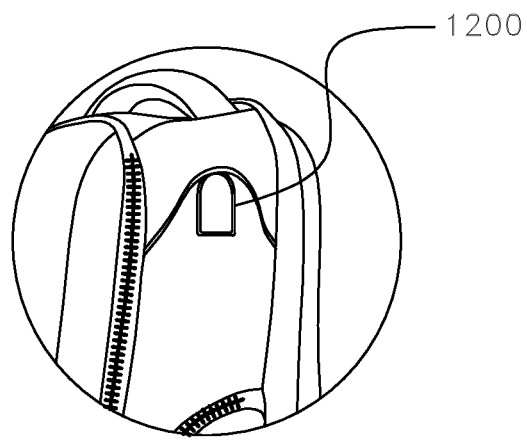
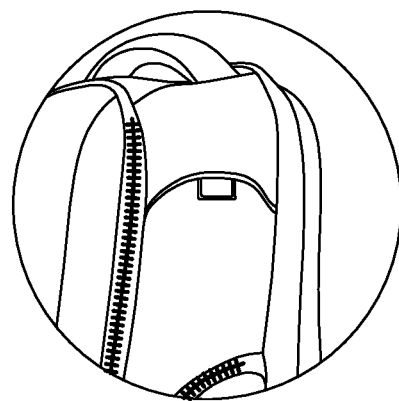
Fig. 32  Fig. 33
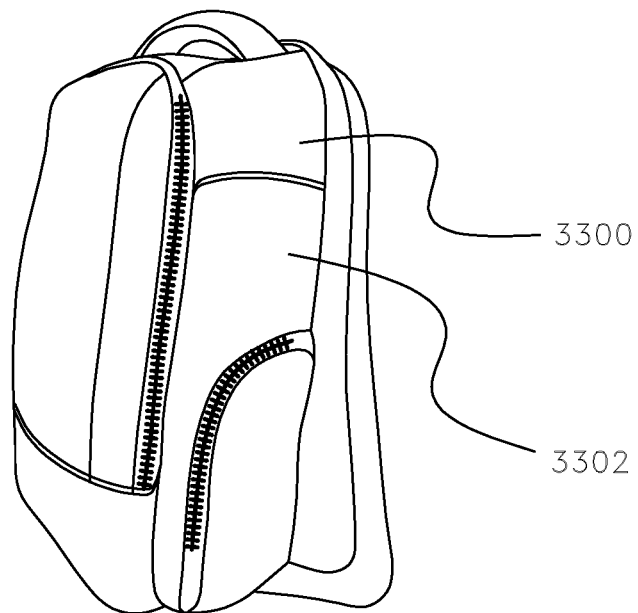
Fig. 34

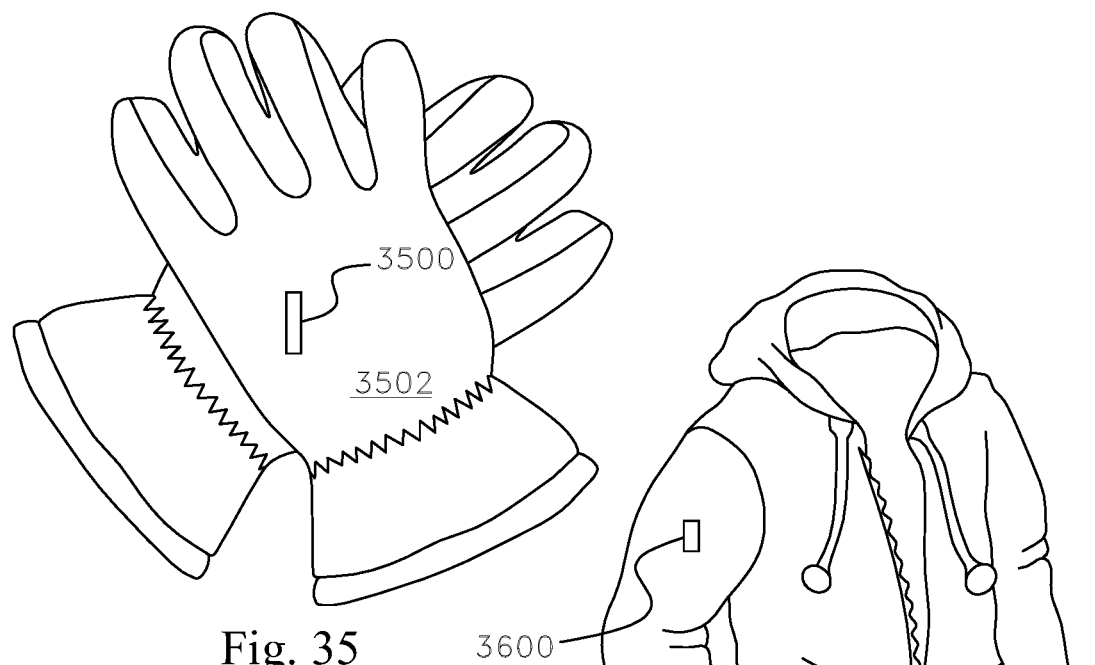
Fig. 35
Fig. 36
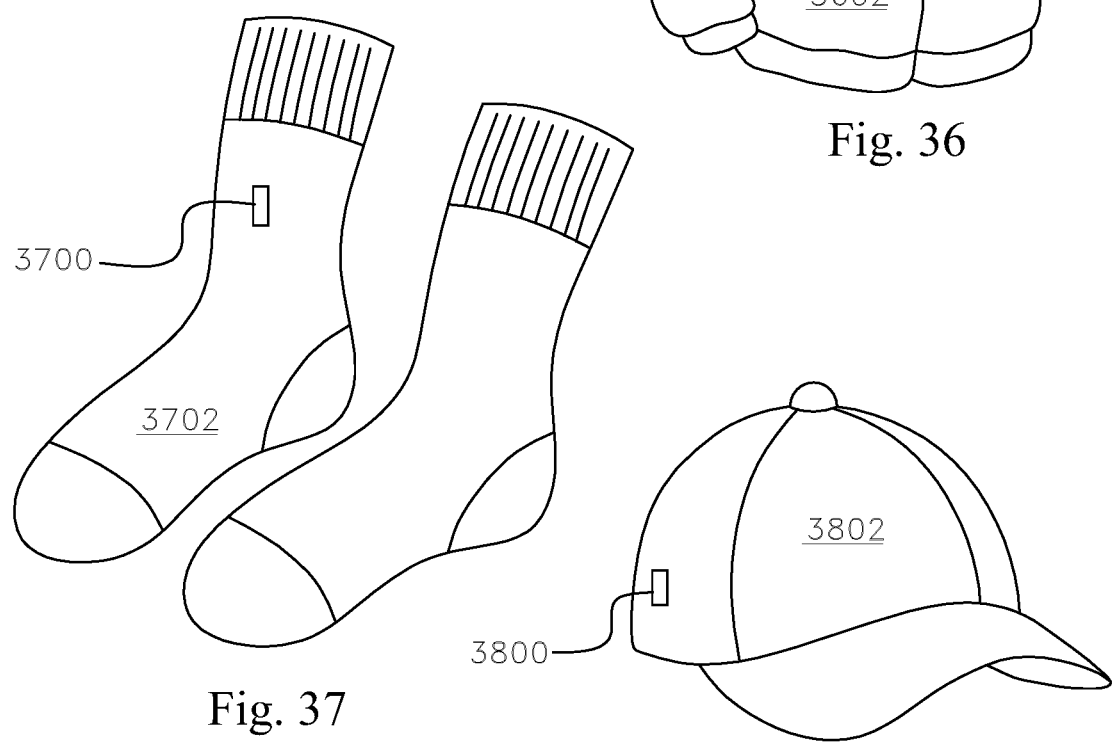
Fig. 37
Fig. 38

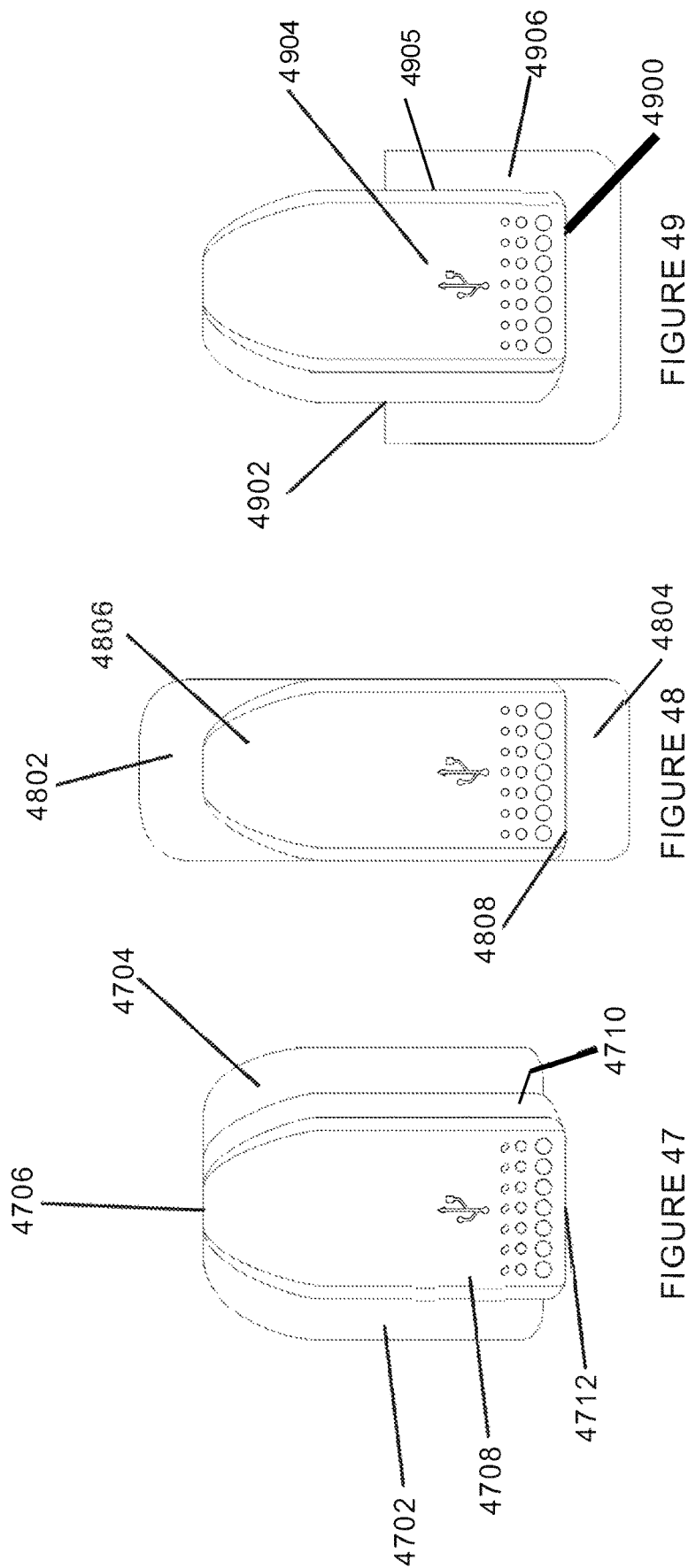

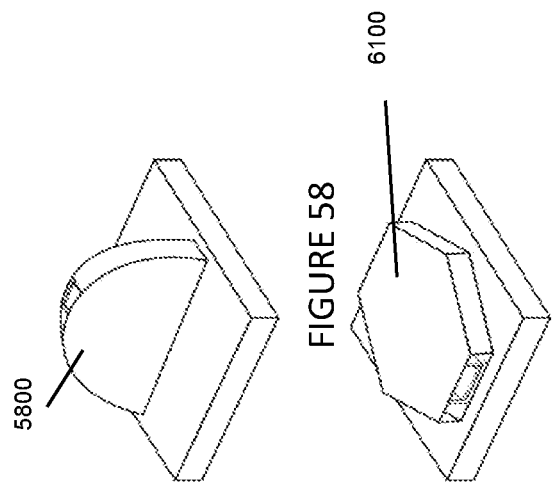
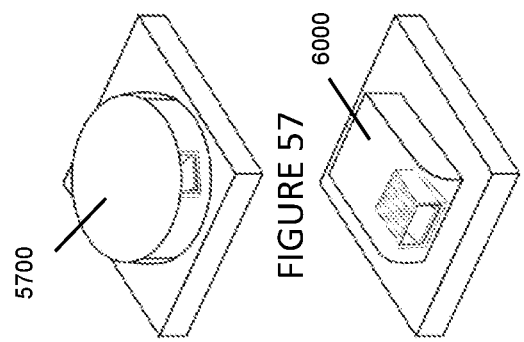
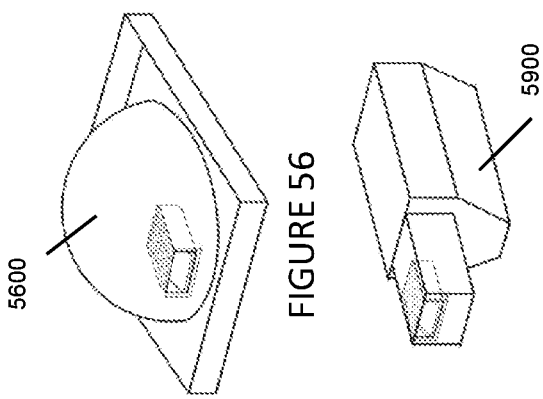

SHEATH FOR USB CHARGER

TECHNICAL FIELD

The present invention model relates to a sheath for a USB charger for convenient charging of personal devices such as smart phones, tablets or any device that requires recharging.

BACKGROUND OF THE INVENTION

With the constant development of our society, diverse portable digital devices are emerging in our lives, and we rely more and more on them, including tablet computers, cellphones, digital cameras, video cameras and the like. In addition to containing the stuff, people want more functionality from the bags and luggage. For example, charging the portable digital devices. Especially for tourists, field staff and those making long-term business trips, it is not easy to charge their digital devices when the battery is dying, causing a lot of inconvenience and trouble in their works and lives. The sheath according to the present invention allows for bags, luggage, clothing, activewear and anything wearable or carried to be equipped with a charging function, or a portable power source. It is no longer necessary to open the bag, luggage or clothing for charging, which is convenient.

SUMMARY OF THE INVENTION

The present invention intends to overcome the disadvantages stated above, and provides a sheath that may be incorporated into luggage, bags, gloves, activewear, jacket, socks, shoes, hats, glasses, goggles, belts or anything wearable or that can be carried for convenient charging, which enables the user to charge a device or product needing to be charged conveniently at any time or any place during traveling, without necessarily opening the bag, luggage, or clothing nor taking out the power source for charging. The term "body" refers to any suitable base that the sheath may be attached to for easy charging, including, without limitation a bag, luggage, clothing, activewear, shoes, hats, glasses, belt or anything wearable or that can be carried.

The present invention is realized in the following way a sheath for convenient charging is provided, comprising: a sheath having at least three sides, a first tapered closed end and a second open end, wherein at least a portion of the sheath extends above an outer surface of a body, wherein the body has an inner surface, an outer surface and a opening between the inner surface and the outer surface; wherein the sheath is at the opening and the sheath receives a female end of a USB cable having four sides, an operative end and a cord end; and wherein the operative end of the female end of the USB cable is in communication with the second open end of the sheath and the cord end of the female end of a USB cable is in communication with the first tapered closed end of the sheath to provide the female end of the UBS cable in a flat position with the operative end of the female connector being uncovered and above the outer surface of the body.

During traveling, when the battery of the product to be charged is dying, it is only necessary to plug the charging interface of the product to be charged into the female end of the USB cable, then the charging starts, without necessarily opening the bag or luggage, nor taking out the power source for charging.

The sheath may be further equipped with a dust cap for dust proofing. The sheath may also have openings for ventilation, to prevent overheating of the device. The opening may be provided on the surface of the body, the female connector is operatively exposed outside the opening, and a dust cap may be attached on the side of the female connector. For the convenience of the configuration of the USB extension cable, the bag or luggage body may be provided with a cable laying channel from the power storage device placing space to the opening for the penetration of the USB extension cable. In order to prevent the loss of the bag or luggage, the female connector of the USB extension cable may be further equipped with a Bluetooth anti-lost alarm, which is used to connect to the Bluetooth device on the product to be charged. For real-time positioning or location of the bag or luggage for convenient charging provided by the utility model, the female connector of the USB extension cable may be further equipped with a GPS device for positioning (or locating).

Compared with the prior art, the present invention enjoys the following advantages (1) provides a body for convenient charging, which enables a user to charge a product needing to be charged conveniently at any time or any place during traveling, without necessarily opening the bag or luggage, nor taking out the power source for charging. (2) the charging interface is featured with waterproof and dust-proof functions, resulting in reliable performance; (3) the flat position of the female end of the USB provides a sturdy position for the external USB cable to connect to. In this way, a user may, with one hand attach an external USB cable. The sheath may also be typically installed to face down towards the ground on the body. This also provides an additional level of waterproofing, as the open end is faced downward.

BRIEF DESCRIPTION OF THE DRAWINGS

The utility model is further described as follows with reference to drawings and embodiments:

FIG. 11 depicts aspects of the present invention;
FIG. 12 depicts aspects of the present invention;
FIG. 13 depicts aspects of the present invention;
FIG. 19 depicts aspects of the present invention;
FIG. 20 depicts aspects of the present invention;
FIG. 21 depicts aspects of the present invention;
FIG. 22 depicts aspects of the present invention.

FIG. 32 depicts aspects of the present invention;
FIG. 33 depicts aspects of the present invention;
FIG. 34 depicts aspects of the present invention;
FIG. 35 depicts aspects of the present invention;
FIG. 36 depicts aspects of the present invention;
FIG. 37 depicts aspects of the present invention;
FIG. 38 depicts aspects of the present invention;
FIG. 47 depicts aspects of the present invention;
FIG. 48 depicts aspects of the present invention;
FIG. 49 depicts aspects of the present invention;
FIG. 56 depicts aspects of the present invention;
FIG. 57 depicts aspects of the present invention;
FIG. 58 depicts aspects of the present invention;
FIG. 59 depicts aspects of the present invention;
FIG. 60 depicts aspects of the present invention;
and
FIG. 61 depicts aspects of the present invention.

DETAILED DESCRIPTION OF THE EMBODIMENTS

The content of the utility model is further described in detail as follows with reference to the drawings for specification and specific embodiments.

Figure 1:
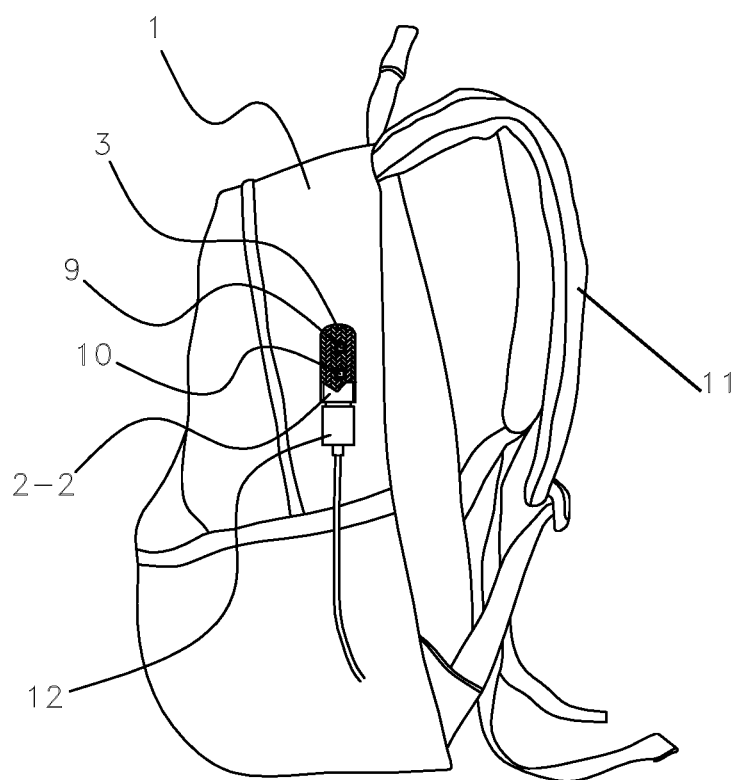
FIG. 1 depicts aspects of the present invention.
Figure 2:
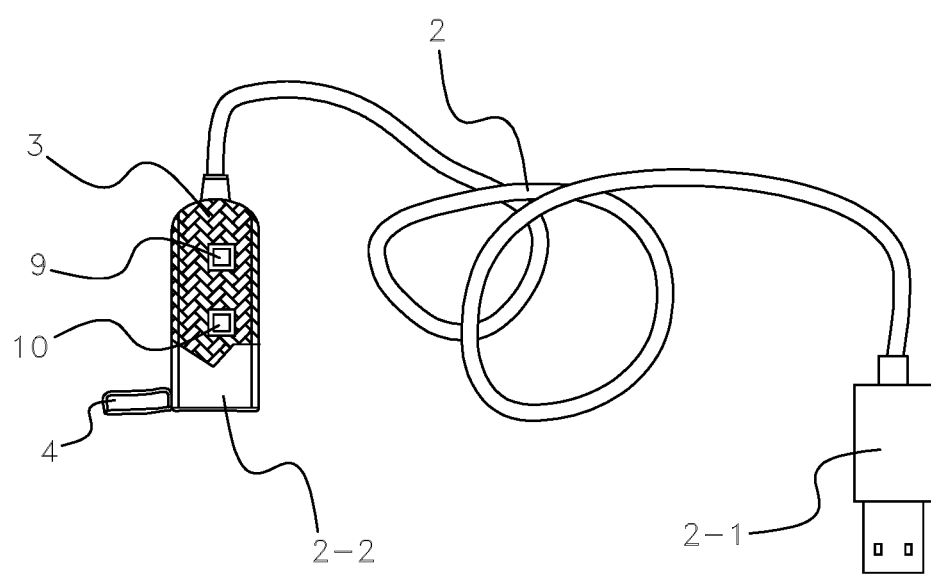
FIG. 2 depicts aspects of the present invention.

FIG. 1 shows embodiment 1 of the utility model, which is a backpack comprising the bag body 1, wherein, a placing space for placing an electrical storage device (which is not shown in the drawing) is provided inside the bag body 1, and a opening on the side of the bag body 1; the bag further comprises a USB extension cable 2 on the bag body 1, and the male connector 2-1 of the USB extension cable 2 is connected to the power storage device in the power storage device placing space; the female connector 2-2 is exposed outside the opening, and the female connector 2-2 is equipped with a sheath 3 for water proofing wrapped on the outer surface of the female connector 2-2; the male connector 2-2 is further equipped with a Bluetooth anti-lost alarm 9, which is used to connect to the Bluetooth device on the product to be charged, and a GPS device 10 for positioning. The sheath as depicted in FIGS. 1 and 2 is a woven material that has at least one ventilation opening (the woven layers provide openings between each of the woven layers). The openings are small, as to protect the female connector contained inside.

During traveling, when the battery of the product to be charged is dying, it is only necessary to plug the external USB connecting line 12 to the female connector 2-2 of the USB extension cable 2, then the charging starts, without necessarily opening the bag or luggage, nor taking out the power source for charging.

FIG. 2 shows embodiment 2 of the utility model, which is different to the embodiment 1 that the sheath 3 is further equipped with a dust cap 4 for dust proofing, and the dust cap 4 is attached on the side of the female connector 2-2, which is overturning connected to the side of the female connector 2-2.

Figure 3:
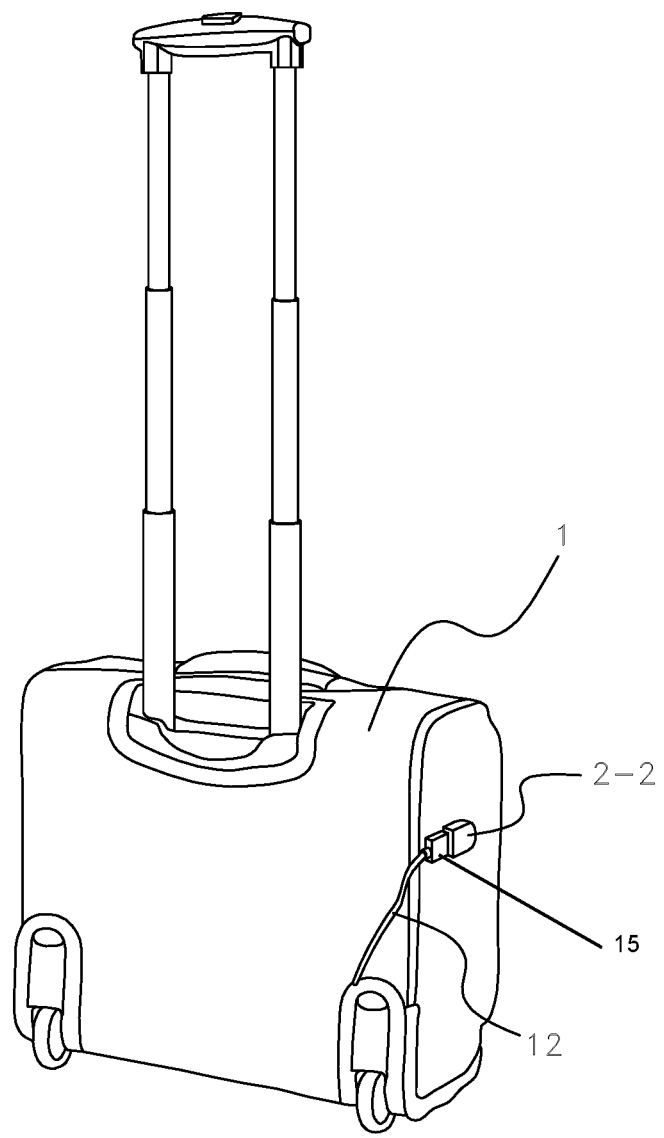
FIG. 3 depicts aspects of the present invention.

FIG. 3 shows embodiment 3 of the utility model, which is a rod box comprising the box body 1, wherein, a placing space for placing an electrical storage device (which is not shown in the drawing) is provided inside the box body 1, and a opening on the side of the box body 1; the box further comprises a USB extension cable 2 on the box body 1, and the male connector 2-1 of the USB extension cable 2 is connected to the power storage device in the power storage device placing space; the female connector 2-2 is exposed outside the opening, and the female connector 2-2 is equipped with a sheath 3 for water proofing wrapped on the outer surface of the female connector 2-2, and the external USB connecting line 12 connected to the female connector 2-2.

Figure 4:
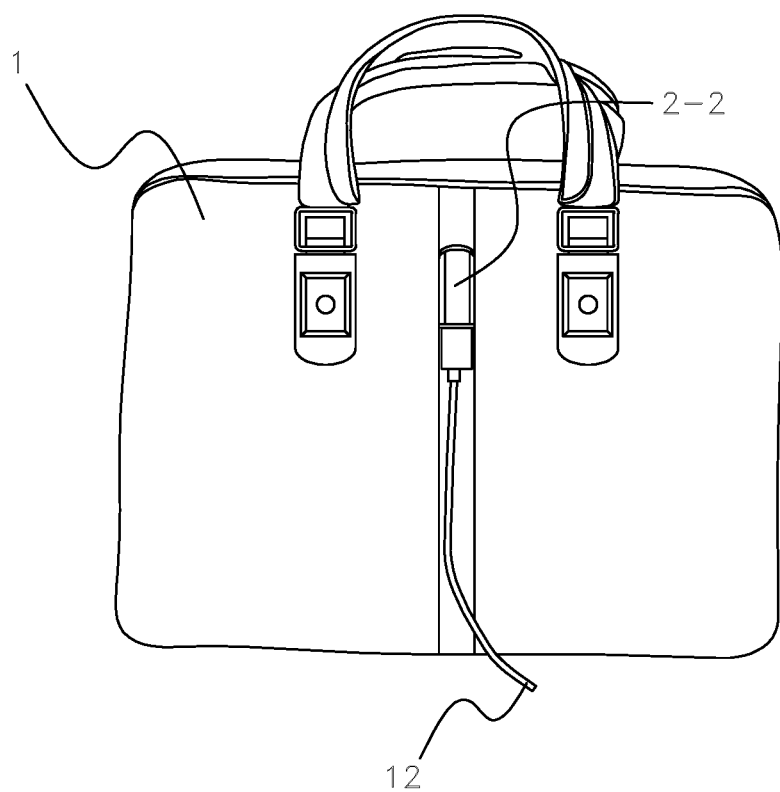
FIG. 4 depicts aspects of the present invention.

FIG. 4 shows embodiment 4 of the utility model, which is a gentlemen's bag comprising the bag body 1, wherein a placing space for placing an electrical storage device (which is not shown in the drawing) is provided inside the bag body 1, and a opening (which is not shown in the drawing) on the surface of the bag body 1; the bag further comprises a USB extension cable 2 on the bag body 1, and the male connector 2-1 of the USB extension cable 2 is connected to the power storage device in the power storage device placing space; the female connector 2-2 is exposed outside the opening, and the female connector 2-2 is equipped with a sheath 3 for water proofing wrapped on the outer surface of the female connector 2-2.

Figure 5:
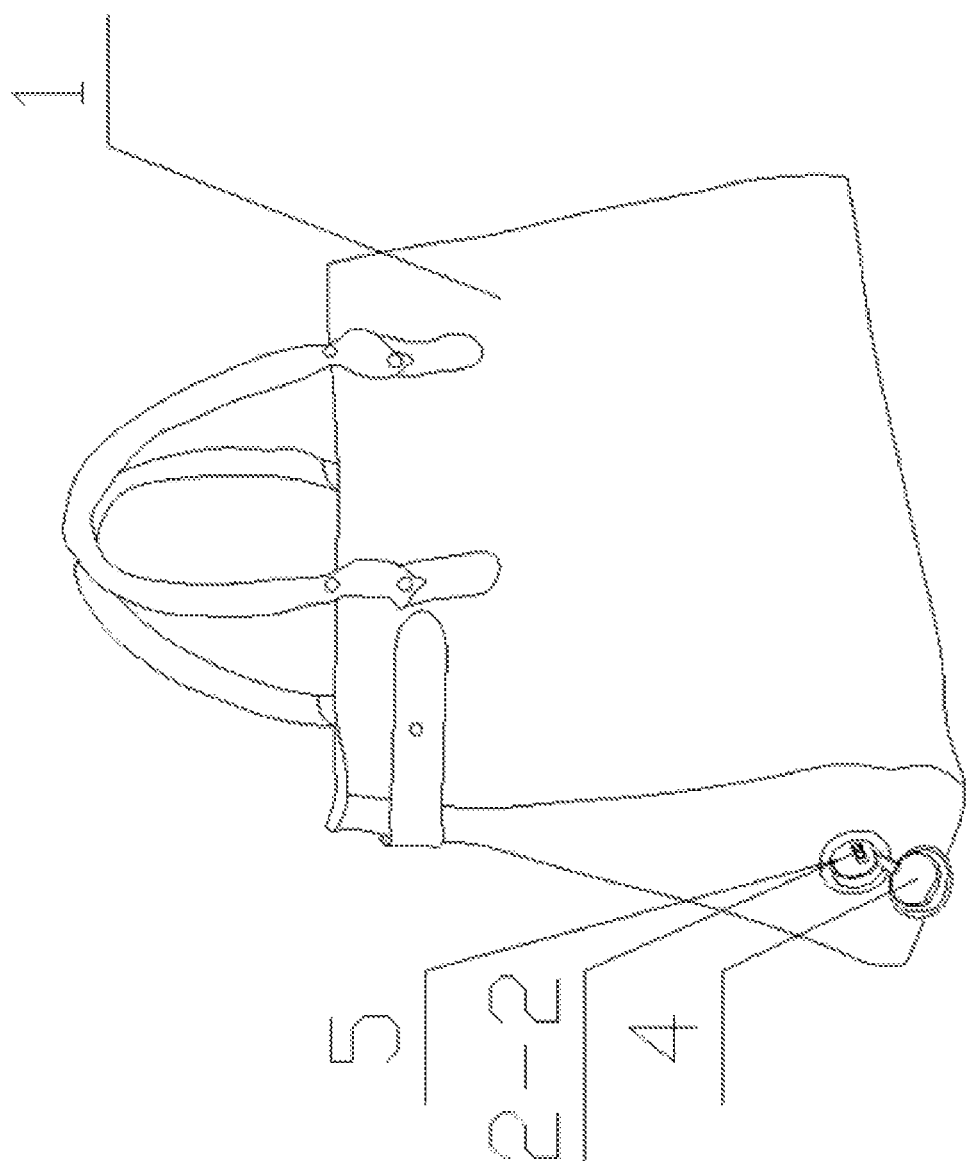
FIG. 5 depicts aspects of the present invention.

FIG. 5 shows embodiment 5 of the utility model, which is a lady handbag comprising the bag body 1, wherein, a placing space for placing an electrical storage device (which is not shown in the drawing) is provided inside the bag body 1, and a opening at the bottom on the side of the bag body 1; the bag further comprises a USB extension cable 2 on the bag body 1, and the male connector 2-1 of the USB extension cable 2 is connected to the power storage device in the power storage device placing space; the female connector 2-2 is at the opening, and the dust cap 4 is at the opening of the groove 5, which is overturning connected to the groove 5.

Figure 6:
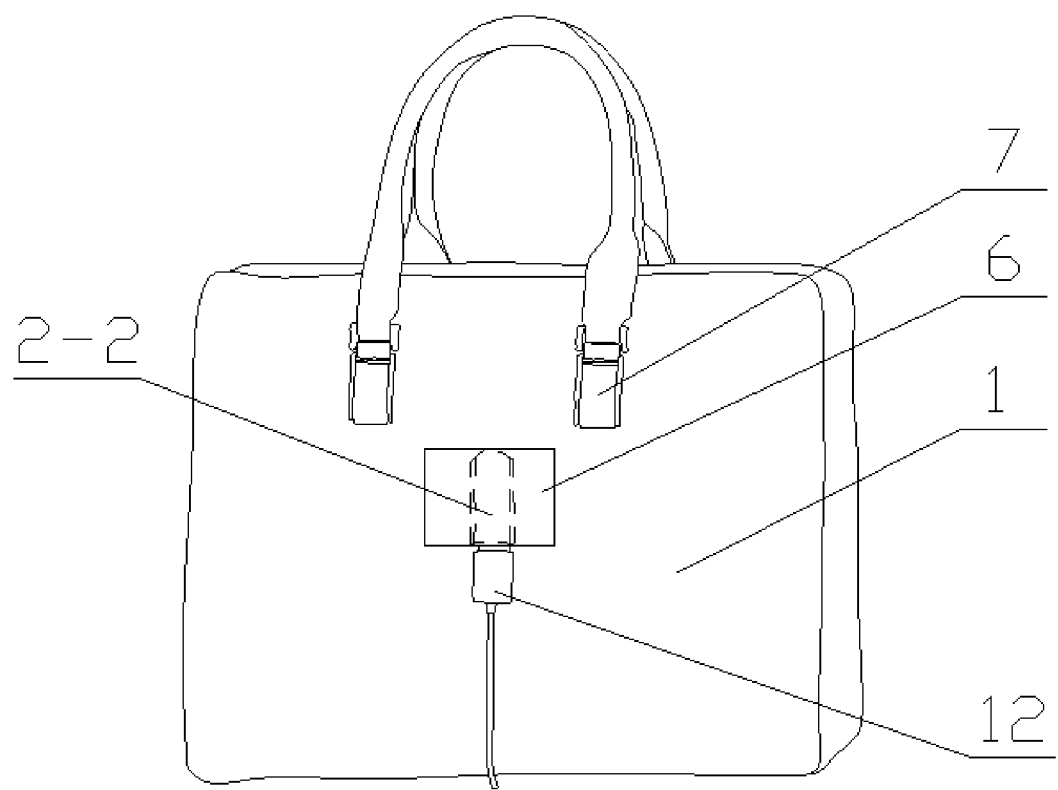
FIG. 6 depicts aspects of the present invention.

FIG. 6 shows embodiment 6 of the utility model, which is a briefcase comprising the case body 1, wherein, a placing space for placing an electrical storage device (which is not shown in the drawing) is provided inside the case body 1, and a opening at the bottom on the side of the case body 1; the case further comprises a USB extension cable 2 on the case body 1, and the male connector 2-1 of the USB extension cable 2 is connected to the power storage device in the power storage device placing space; the opening is below the nameplate 6, and the female connector 2-2 is at the opening.

Figure 7:
FIG. 7 depicts aspects of the present invention.

FIG. 7 shows embodiment 7 of the utility model, which is a briefcase. The difference between this embodiment and the embodiment 6 is that: the opening is below the fastener 7, and the female connector 2-2 is in the opening.

Figure 8:
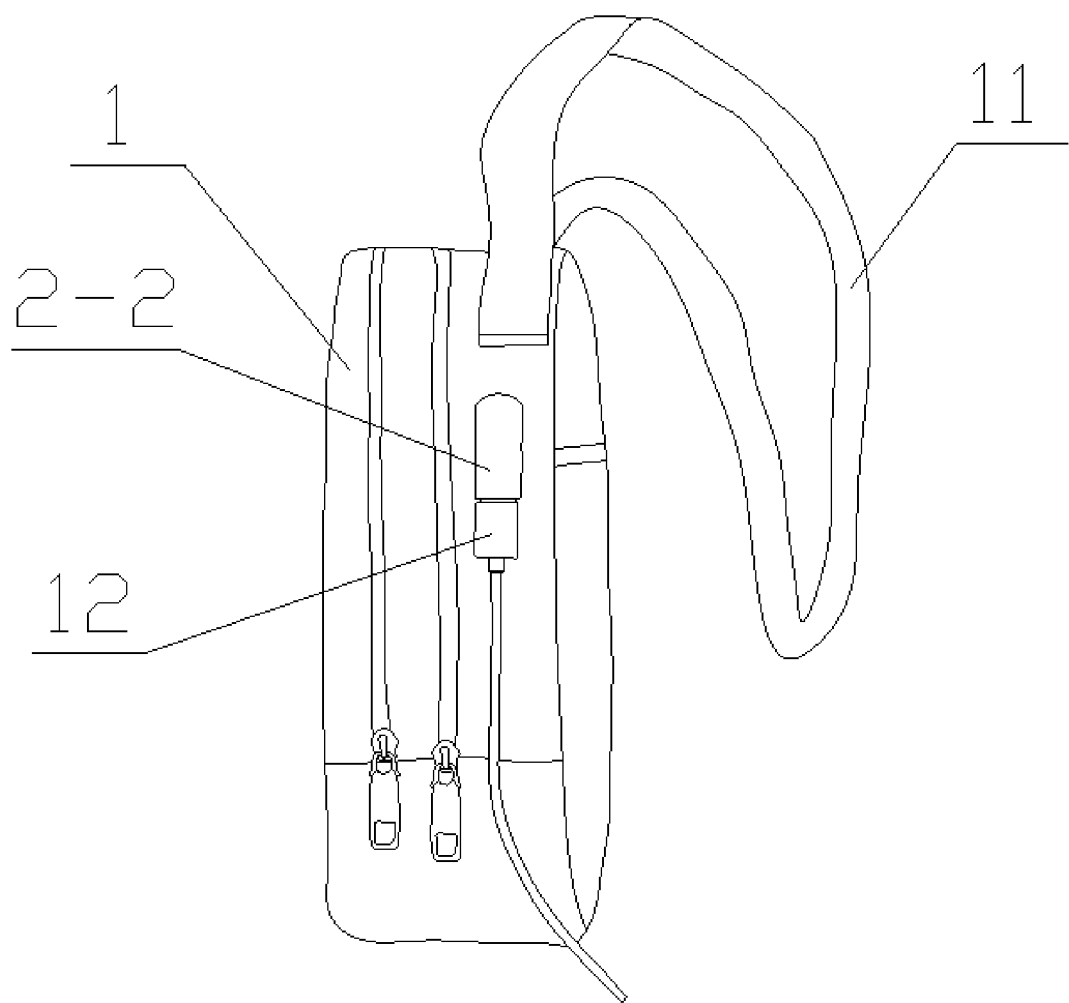
FIG. 8 depicts aspects of the present invention.

FIG. 8 shows embodiment 8 of the utility model, which is a shoulder bag comprising the bag body 1, wherein, a placing space for placing an electrical storage device (which is not shown in the drawing) is provided inside the bag body 1, and a opening on the side of the bag body 1; the bag further comprises a USB extension cable 2 on the bag body 1, and the male connector 2-1 of the USB extension cable 2 is connected to the power storage device in the power storage device placing space; the female connector 2-2 is exposed outside the opening, and the female connector 2-2 is equipped with a sheath 3 for water proofing wrapped on the outer surface of the female connector 2-2.

Figure 9:
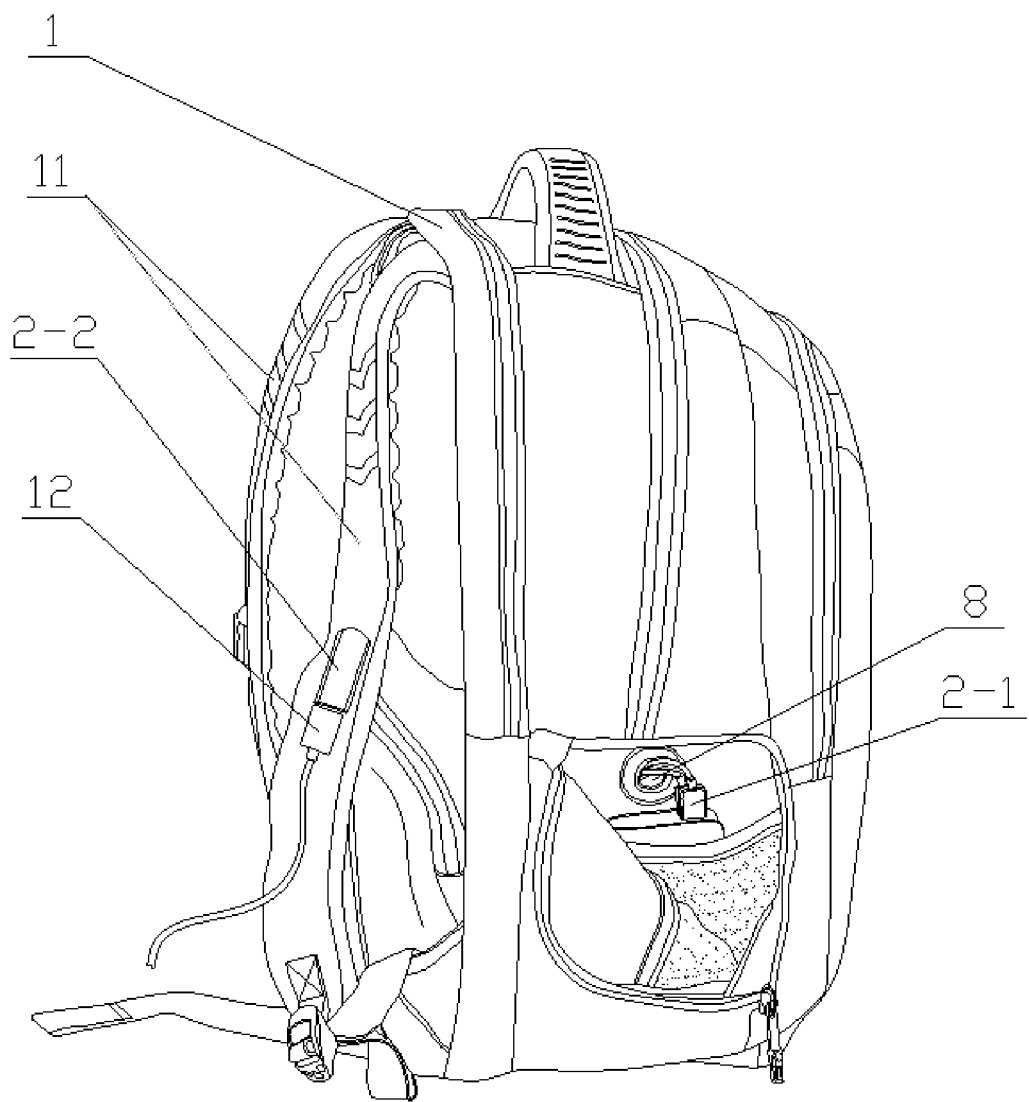
FIG. 9 depicts aspects of the present invention.

FIG. 9 shows embodiment 9 of the utility model, which is an outdoor backpack comprising the bag body 1, wherein, a placing space for placing an electrical storage device is provided inside the bag body 1, and a opening on a shoulder strap of the bag body 1; the bag further comprises a USB extension cable 2 on the bag body 1, and the male connector 2-1 of the USB extension cable 2 is connected to the power storage device in the power storage device placing space; the female connector 2-2 is exposed outside the opening, and the female connector 2-2 is equipped with a sheath 3 for water proofing wrapped on the outer surface of the female connector 2-2; the bag or luggage body 1 is provided with a cable laying channel 8 from the power storage device placing space to the opening for the penetration of the USB extension cable 2.

Figure 10:
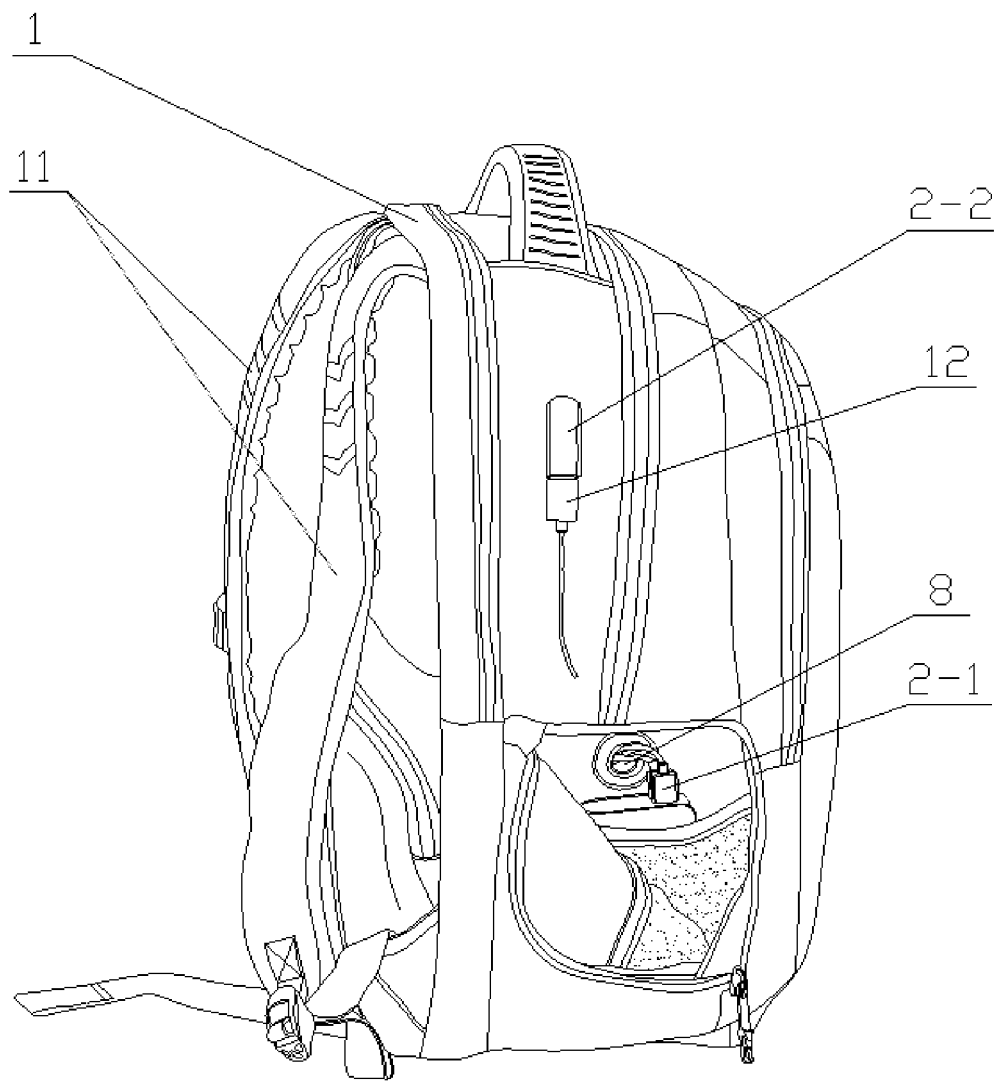
FIG. 10 depicts aspects of the present invention.

FIG. 10 shows the embodiment 10 of the utility model, which is an outdoor backpack. The difference between this embodiment and the embodiment 9 is that: the opening is on the side of the bag body 1.

Figure 14:
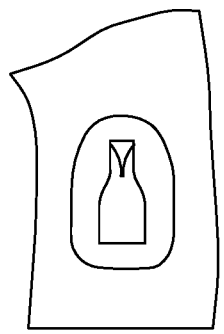
FIG. 14 depicts aspects of the present invention.
Figure 15:
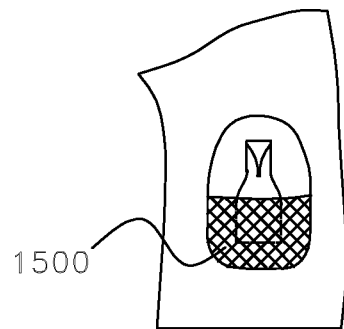
FIG. 15 depicts aspects of the present invention.
Figure 16:
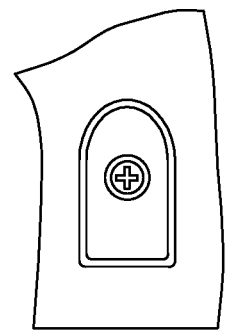
FIG. 16 depicts aspects of the present invention.
Figure 17:
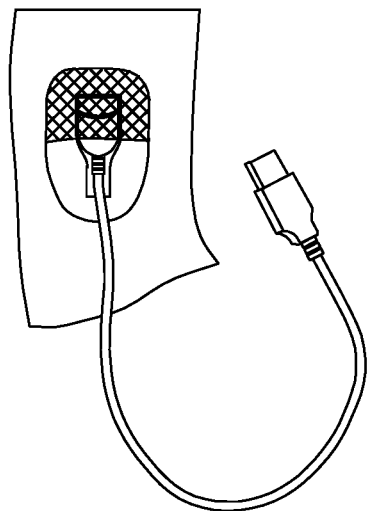
FIG. 17 depicts aspects of the present invention.
Figure 18:
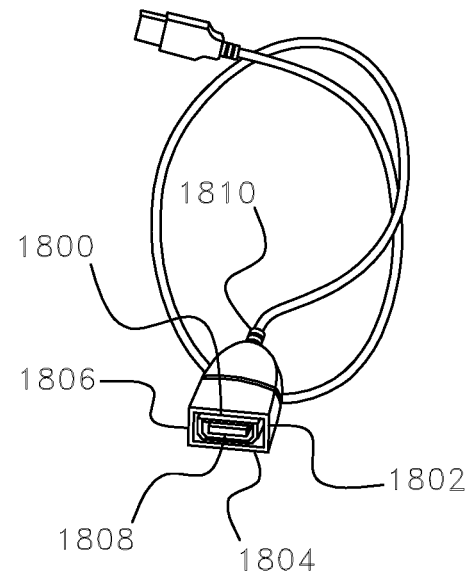
FIG. 18 depicts aspects of the present invention.
Figure 23:
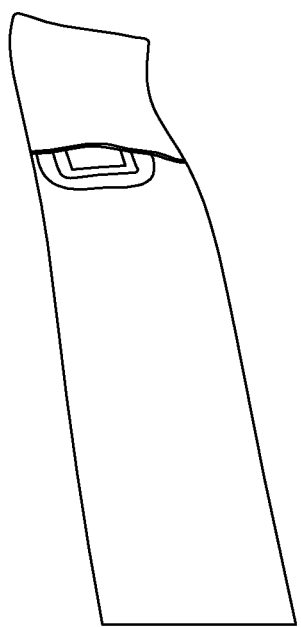
FIG. 23 depicts aspects of the present invention.
Figure 24:
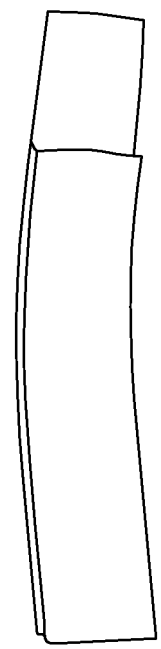
FIG. 24 depicts aspects of the present invention.
Figure 25:
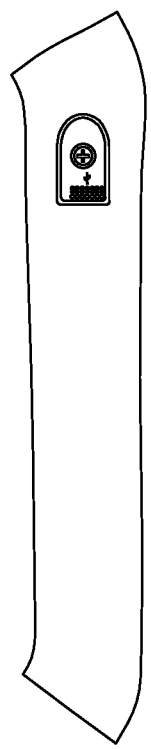
FIG. 25 depicts aspects of the present invention.
Figure 26:
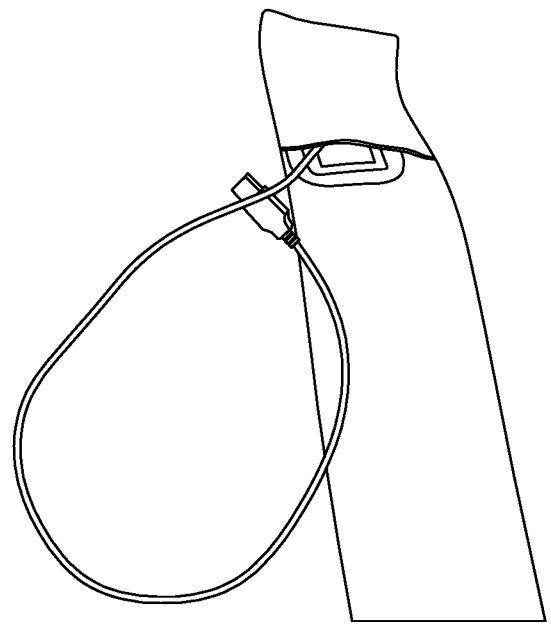
FIG. 26 depicts aspects of the present invention.
Figure 27:
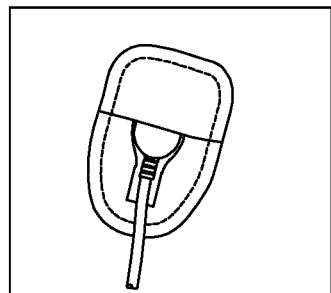
FIG. 27 depicts aspects of the present invention.
Figure 28:
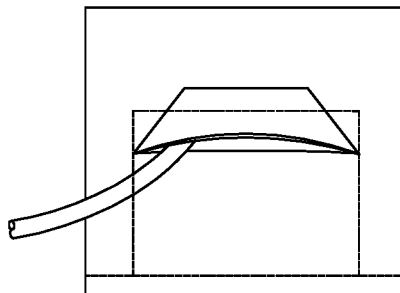
FIG. 28 depicts aspects of the present invention.
Figure 29:
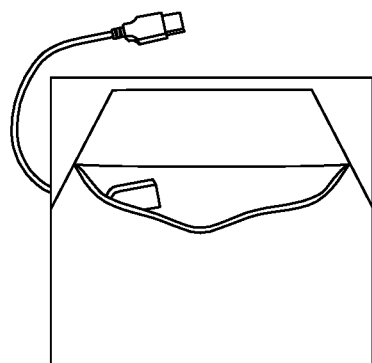
FIG. 29 depicts aspects of the present invention.
Figure 30:
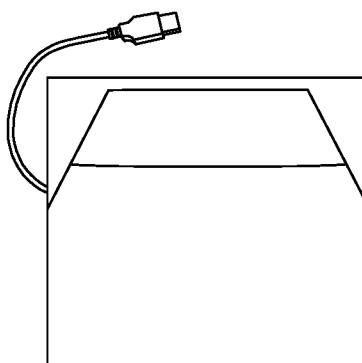
FIG. 30 depicts aspects of the present invention.
Figure 31:
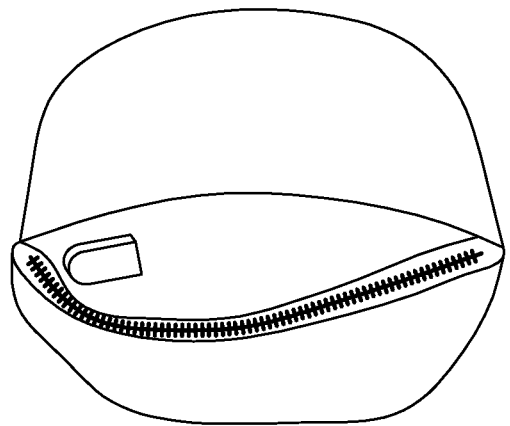
FIG. 31 depicts aspects of the present invention.
Figure 43:
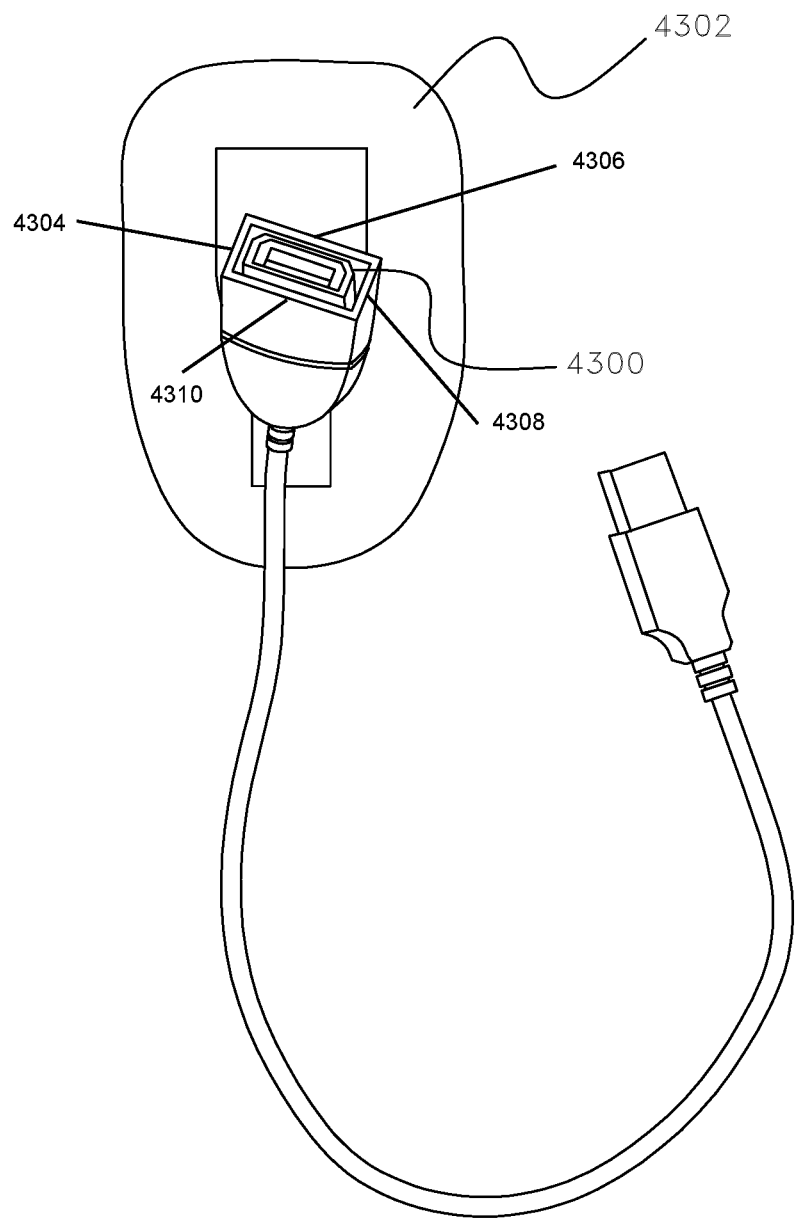
FIG. 43 depicts aspects of the present invention.
Figure 44:
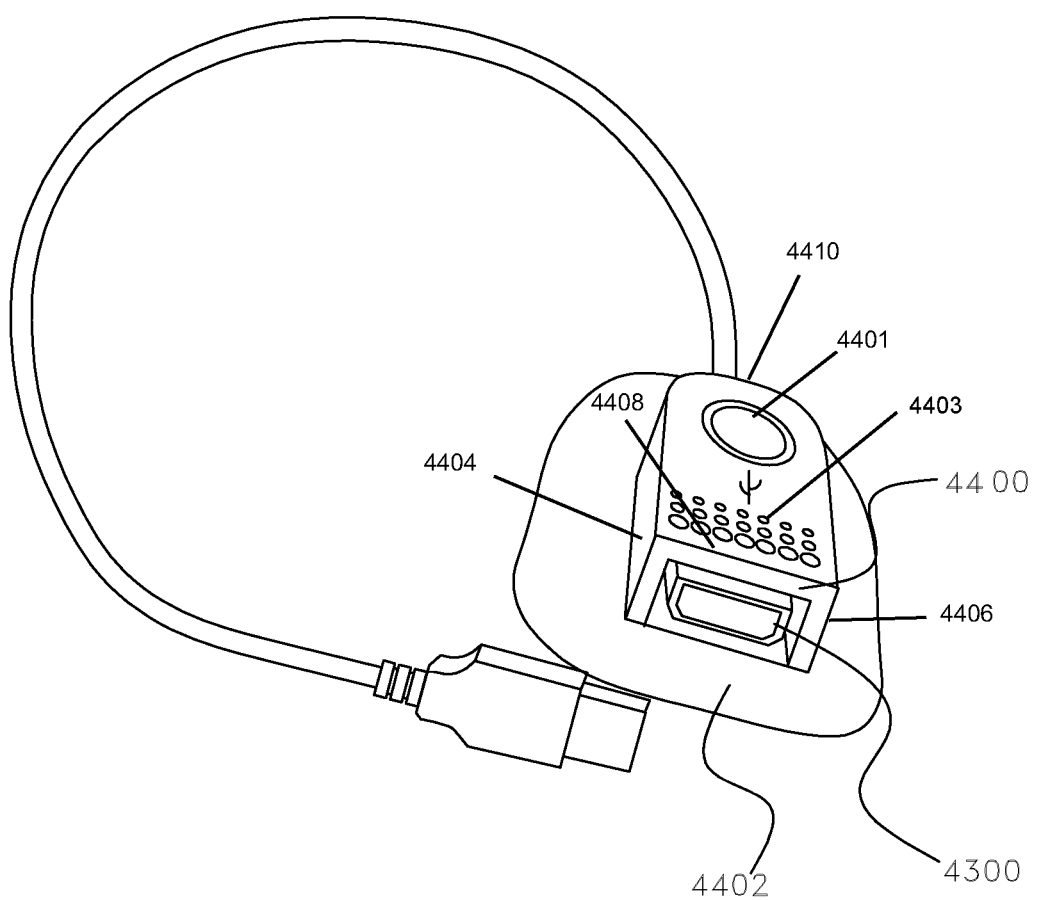
FIG. 44 depicts aspects of the present invention.
Figure 45:
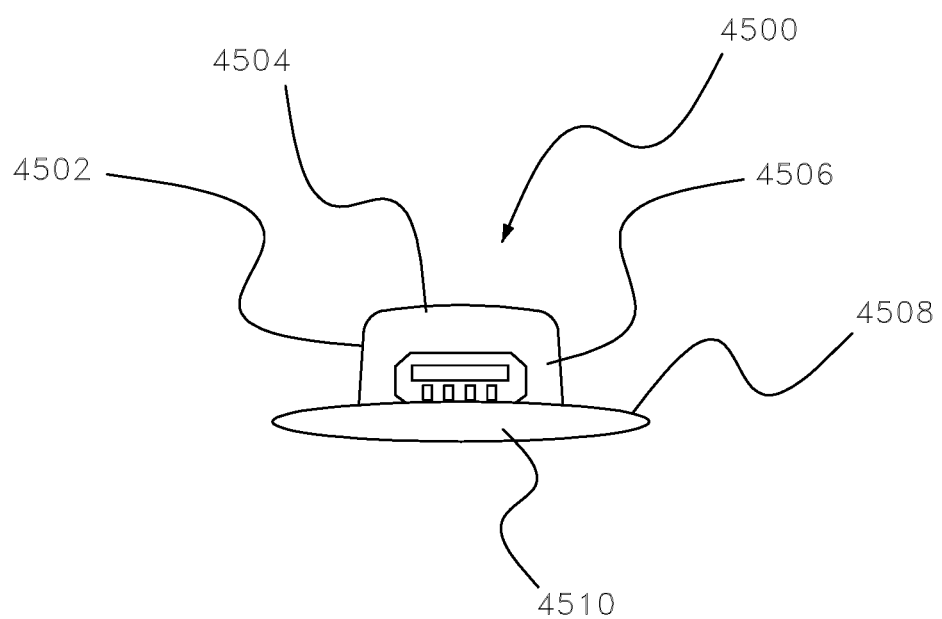
FIG. 45 depicts aspects of the present invention.
Figure 46:
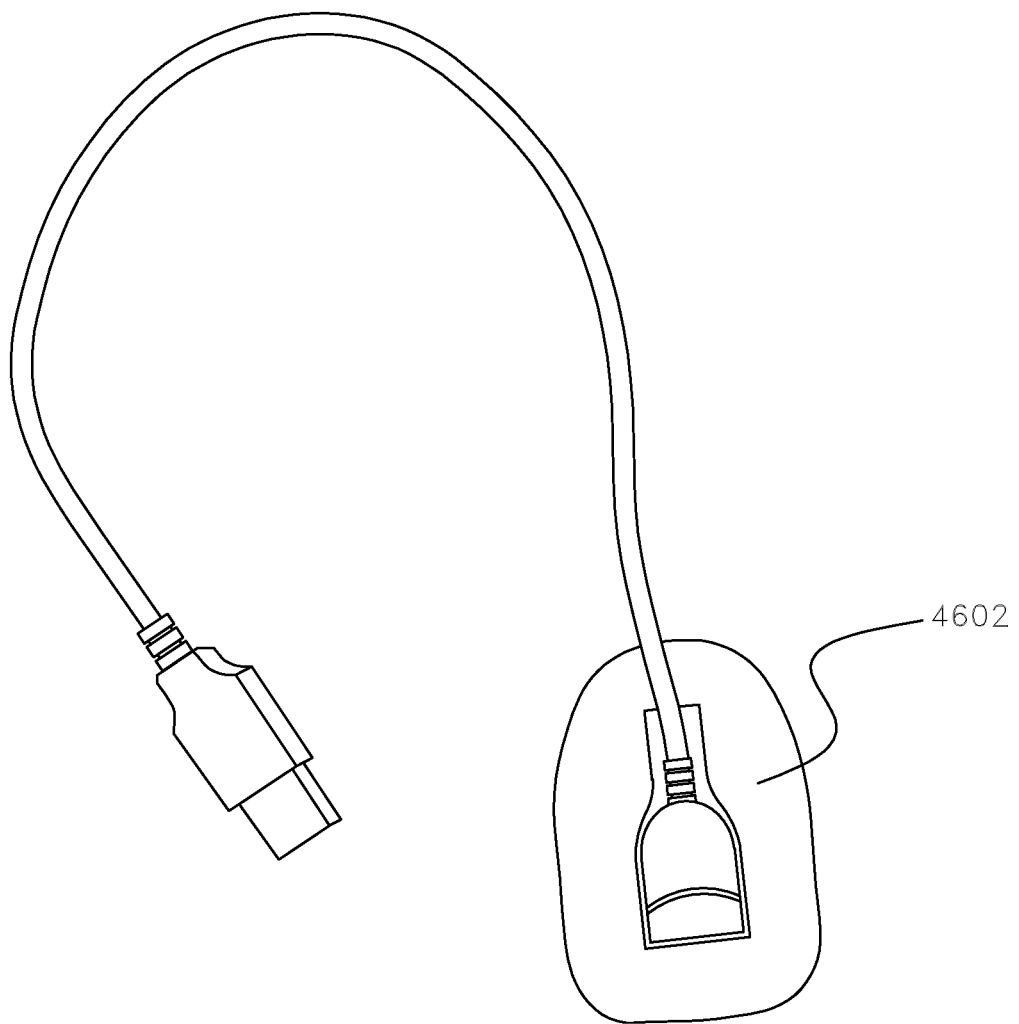
FIG. 46 depicts aspects of the present invention.

FIGS. 11-13 depicts a sheath (1200) for convenient charging, comprising: a sheath (1200) having at least three sides (1202, 1204 and 1206), a first tapered closed end (1208) and a second open end (1210), wherein at least a portion of the waterproof sheath (1200) extends above an outer surface of a body (1300) wherein the body has an inner surface (see e.g. 1900), an outer surface (e.g. 2102) and a opening (1302) between the inner surface (1900) and the outer surface (e.g. 2102). The opening (1302) may also be described as a cutout in the body which is necessarily in the outer surface and the inner surface. The waterproof sheath (e.g. 1200 and 2100) is at the opening (1302) and the waterproof sheath receives a female end of a USB cable (2200) having four sides, an operative end and a cord end. The sheath tapers down from the four sides to the first tapered closed end. Typically, as shown, the sheath tapers down from a point less than half the length of the four sides to the first tapered closed end. The taper serves the purpose to accommodate the cord end of the female end of the USB cable such that it is retained and does not easily fall out. FIG. 18 depicts an example of a female end of a USB cable having four sides (1800, 1802, 1804, 1806), an operative end (1808) and a cord end (1810). The operative end (1808) refers to the end of the female end of a USB cable that may operate and accept an external USB connecting line having a male end. The sheath may also have at least one ventilation opening (See FIG. 44, ventilation openings 4403) on at least one of the at least three sides of the water proof sheath. This provides ventilation to prevent overheating. The male end of the external USB connecting line is plugged into the operative end (1808) of the female end of the USB cable when the user wants to utilize the device. For example, when the user wants to charge an external item, such as a mobile phone. FIG. 1 depicts an example of an external USB connecting line (12) with the male end plugged into the operative end of the female end of the USB cable. The operative end (1808, 4300) of the female end of the USB cable is in communication with the second open end of the waterproof sheath (4400) and the cord end (1810) of the female end of a USB cable is in communication with the first tapered closed end (1208) of the sheath to provide the female end of the UBS cable in a flat position with the operative end of the female connector being uncovered and above the outer surface of the body (See FIG. 44). FIG. 43 depicts the female end of a USB cable (4300) and the underside of the sheath (4302). FIG. 44 depicts a front view of the sheath with the female end of the USB cable (4300) contained therein. FIG. 45 depicts a front view of the sheath (4500) depicting the at least three sides (4502, 4504 and 4506). It is noted that the sheath may also have a surrounding bottom attachment portion (4508 and 4602) which allows the sheath to be easily attached to a body. The surrounding bottom attachment portion is a flat portion surrounding the at least three sides, the first tapered closed end and the second open end of the sheath. As shown in FIG. 14-16 this may allow the sheath to be sewn or glued to the body. The attachment portion (4508 and 4602) is in communication with the inner surface of the body. There may also be a piece of fabric (1500) in communication with the inner surface of the body and retaining at least the operative end of the female end of the USB cable in the sheath. The piece of fabric may partially (as depicted in FIG. 15) or entirely (as depicted by the rigid cover 2000 in FIG. 20 and depicted in FIG. 23) cover the opening between the inner surface and the outer surface and has an opening for the USB cable. FIG. 20 depicts that the piece of fabric is a reinforced piece of fabric which may be a rigid cover (2000) in communication with the inner surface of the body and retaining at least the operative end of the female end of the USB cable in the sheath. The sheath may also have four sides with a bottom side (4510) having a bottom side opening to allow the female end of the USB cable (2200) to sit in the sheath and the cord of the USB to go through the bottom side opening and the opening. This is to say that the sheath may have at least three sides and an embodiment is envisioned with the sheath having four sides without departing from the present invention.

Figures 39, 40:
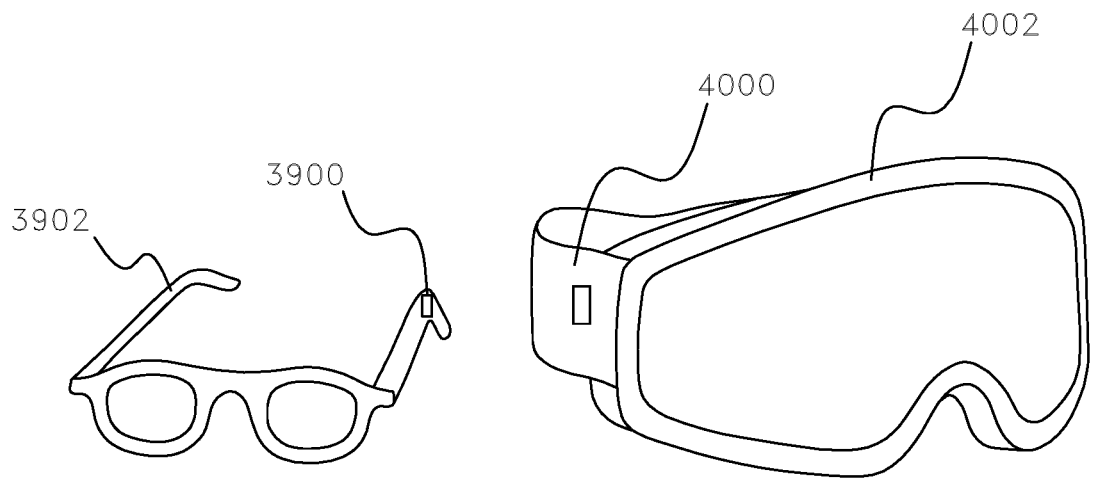
FIG. 39 depicts aspects of the present invention.
FIG. 40 depicts aspects of the present invention.
Figure 41:
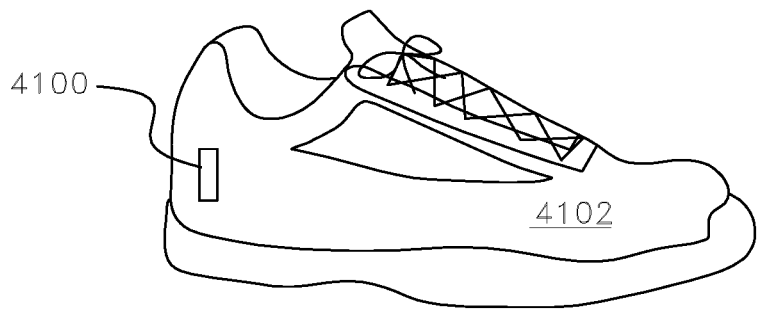
FIG. 41 depicts aspects of the present invention.
Figure 42:
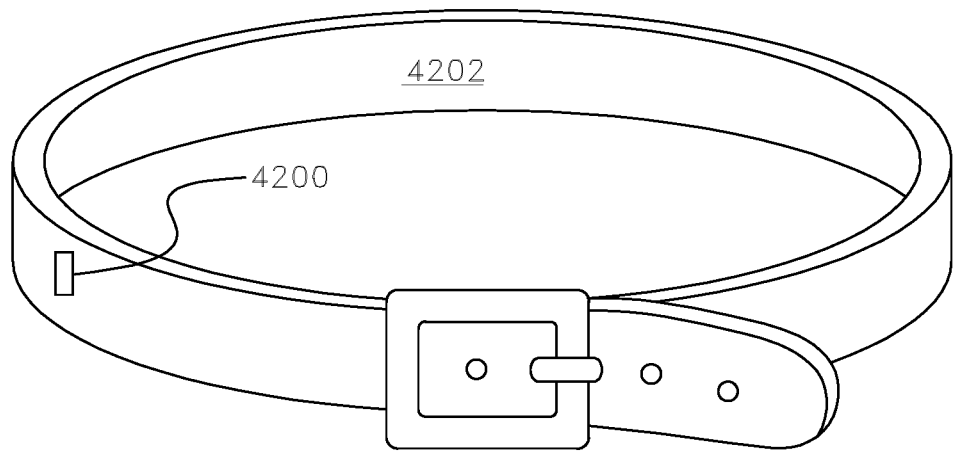
FIG. 42 depicts aspects of the present invention.

The body (2202) may be, for example, luggage (FIG. 3, body 1), bag (FIG. 1, body 1), gloves (FIG. 35, sheath 3500, body 3502), activewear, jacket (FIG. 36, sheath 3600, body 3602), socks (FIG. 37, sheath 3700, body 3702), shoes (FIG. 41, sheath 4100, body 4102), hats (FIG. 38, sheath 3800, body 3802), glasses (FIG. 39, sheath 3900, body 3902), goggles (FIG. 40, sheath 4000, body 4002) and belt (FIG. 42, sheath 4200, body 4202).

There may be a second outer surface (3300) that covers the outer surface of the body (3302). Similarly, the outer surface of the body may be the inside of a pocket (See FIGS. 28, 29, 30 and 31). The outer surface onto which the sheath is mounted may have an additional cover or be on the inside of a pocket without departing from the present invention.

As depicted in FIGS. 1, 4, 6, 7, 8, 9, 10, 32, 33, 34, 36, 37, 38, 40, 41 and 42, the sheath is attached to the body with the first tapered closed end above the second open end. Specially, the second open end is substantially parallel to the ground of the user. This is to say that the open end of the sheath faces the ground. This provides another level of dust and water protection to the operative end of the USB cable.

With reference to FIGS. 44, 47, 48 and 49, a sheath for convenient charging is provided, comprising: a sheath having a left side (4404), a right side (4406), a top side (4408), a first closed end (4410), a second open end (4400) and a surrounding bottom portion (4402) surrounding at least a portion of one of the left side (4404), the right side (4406), the top side (4408), the first closed end (4410) and the second open end (4400) of the sheath. The "surrounding at least a portion of one of the left side (4404), the right side (4406), the top side (4408), the first closed end (4410) and the second open end (4400) of the sheath" is intended to say that the surrounding bottom portion may surround a portion of the sheath that extends above the outer surface of a body, as depicted in FIGS. 47, 48 and 49. As can be seen in FIG. 47, the surrounding bottom portion has a surrounding bottom portion left side (4702) attached to the left side (4708)

and a surrounding bottom portion right side (4704) attached to the right side (4710) of the sheath. It is noted that the surrounding bottom portion left side (4702) is attached to a small portion of the first closed end (4706) and the surrounding bottom portion right side (4704) is also attached to a small portion of the first closed end (4706). In this embodiment, the surrounding bottom portion does not meet the second open end (4712). As can be seen in FIG. 48, the surrounding bottom portion has a surrounding bottom portion first end portion (4802) and a surrounding bottom portion second end portion (4804). In this embodiment, the surrounding bottom portion first end portion (4802) is attached to the first closed end (4806) and the surrounding bottom portion second end portion (4804) is attached to the second open end (4808). As can be seen in FIG. 49, the sheath (4904) has a the surrounding bottom portion (4906) attached a portion of the left side (4902), a portion of the right side (4905) and the second open end (4900).

Figure 52:
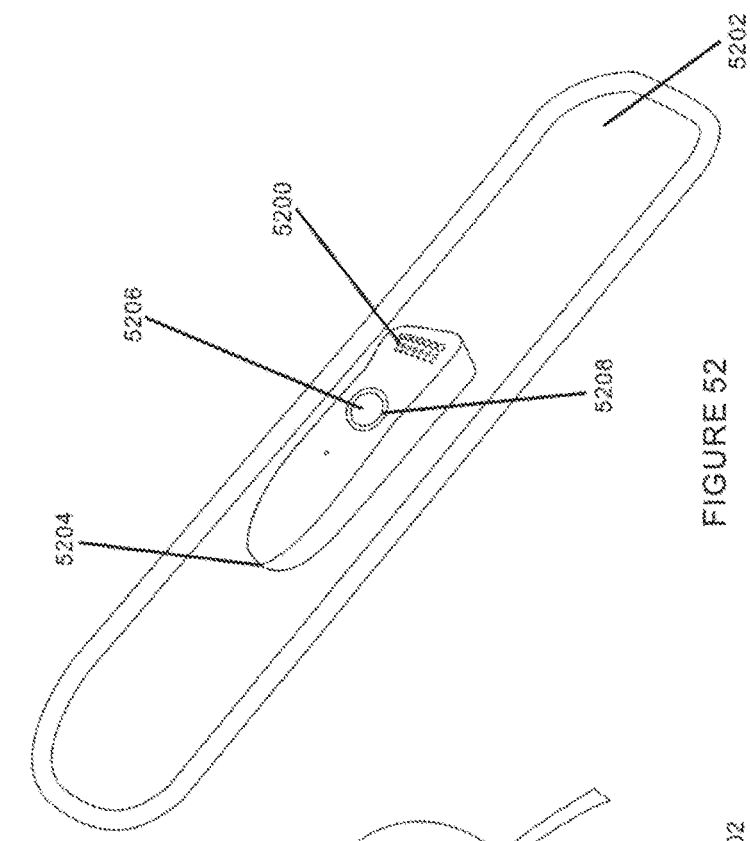
FIG. 52 depicts aspects of the present invention.

When attached to the body, at least a portion of the sheath extends above an outer surface (5202) of a body, wherein the body has an inner surface (not shown in this Figure, see 1900 of FIG. 19 for the inner surface, it would be understood and appreciated by one of ordinary skill in the art that the inner surface is simply the other side of the outer surface), an outer surface (5202) and an opening (5204) between the inner surface and the outer surface. The opening (5204) refers to the hole in the body. This may take different forms. According to one embodiment, as depicted in FIGS. 52, 11, 12, 13, 14, 15, 16, 17, 19, 20, 21, 22, 25, 26 and 27 the surrounding bottom portion touches the inner surface of the body and the sheath sits inside an opening in the body and extends above an outer surface of a body. The body has an opening between the inner surface and the outer surface and the surrounding bottom portion is attached to the inner surface of the body. The surrounding bottom portion (5100) of the sheath in FIG. 52 is not seen as it is on the inner surface of the body. The cord (5102) of the USB cable is on the interior of the body.

Figure 55:
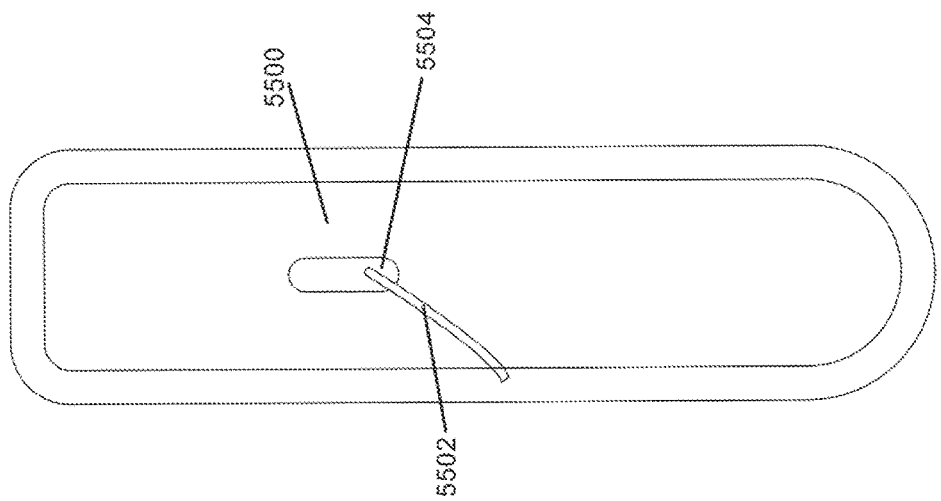
FIG. 55 depicts aspects of the present invention.
Figure 54:
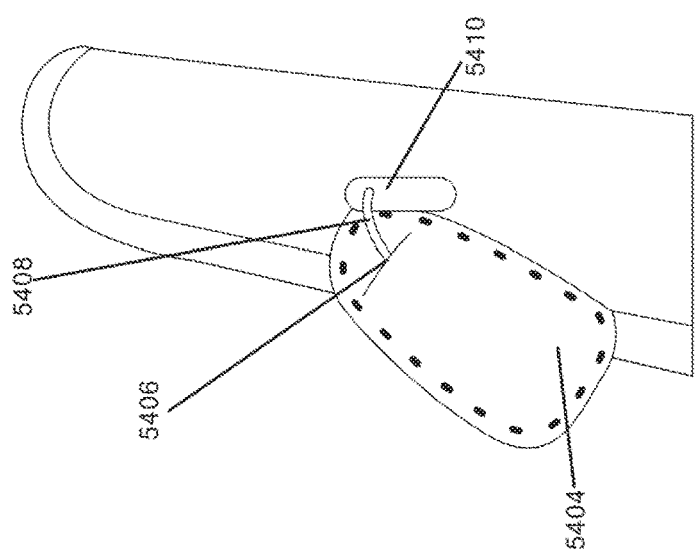
FIG. 54 depicts aspects of the present invention.
Figure 53:
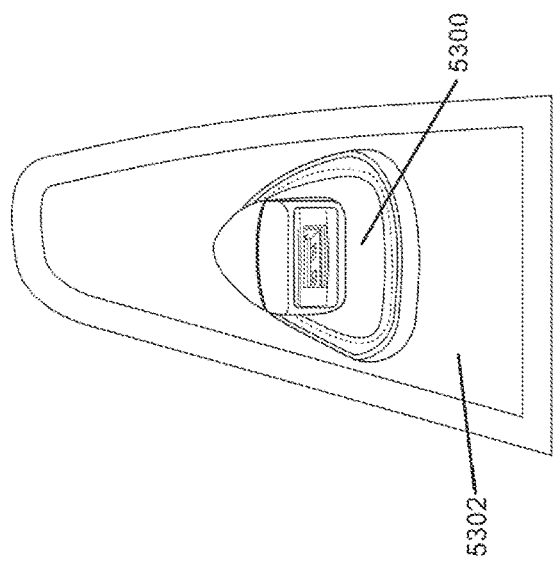
FIG. 53 depicts aspects of the present invention.

Alternatively, as depicted in FIGS. 53, 54 and 55, the entire sheath (including the surrounding bottom portion (5300) may sit on top of the body. The surrounding bottom portion (5300) may be in communication with the outer surface (5302) of the body. There may also be a piece of material (5404) attached to the surrounding bottom portion (5300) to retain the operative end of the female end of the USB cable in the sheath. As can be seen there would be a cord opening (5406) in the piece of material (5404) to allow the USB cable to be attached to the top of the body and the cord (5408) fed through an opening (5410) in the body to the interior of the body. FIG. 55 depicts the interior (5500) of the body showing cord (5502) fed through opening (5504).

Figure 51:
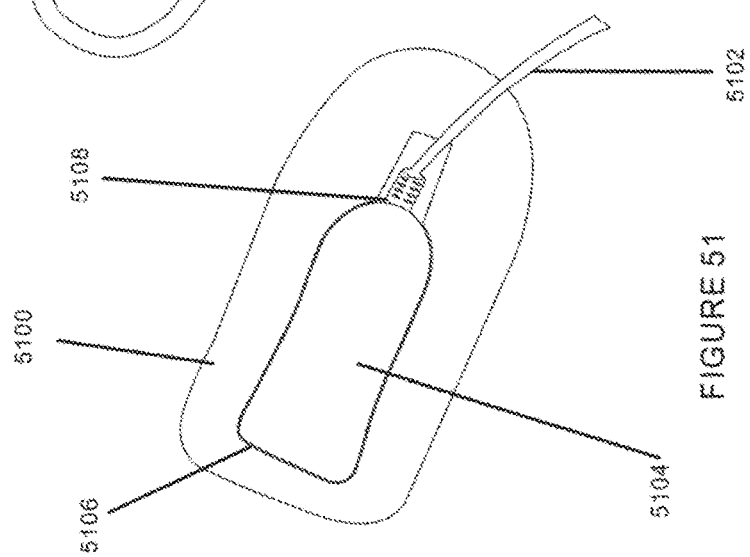
FIG. 51 depicts aspects of the present invention.
Figure 50:
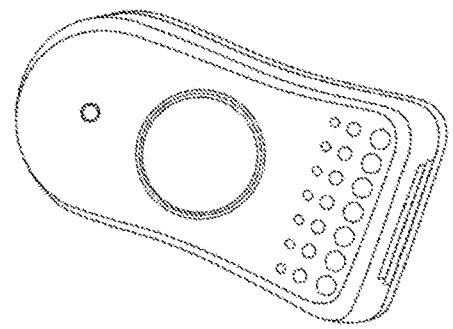
FIG. 50 depicts aspects of the present invention.

In both embodiments (the surrounding bottom portion on top of the body or on the inner surface of the body) the sheath is at the opening and the sheath receives a female end of a USB cable (5104) having four sides (see FIGS. 43, 4304, 4306, 4308 and 4310 depicting the USB cables four sides), an operative end (5106), a cord end (5108) and a cord (5102). As depicted in FIG. 44, the operative end (4300) of the female end of the USB cable is retained in the second open end (4400) of the sheath and the cord end of the female end of the USB cable is retained in the first closed end (4410) of the sheath to provide the female end of the UBS cable in a flat position with the operative end (4300) of the female connector being uncovered and above the outer surface of the body (See FIGS. 52 and 53), wherein the cord of the female end goes through the opening between the inner surface and the outer surface and the surrounding bottom portion is attached to a portion of the body (See FIG. 51 cord (5102) and FIG. 55 cord (5502).

As depicted in FIG. 3, an external USB connecting line (12) having a male end (15), wherein the male end (15) of the external USB connecting line is plugged into the operative end of the female end of the USB cable. At least one of a male connector of a USB extension cable and the female connector of the USB extension cable is further equipped with a wireless technology standard for exchanging data over short distances as an anti-loss alarm, which is used to connect to the device on the product to be charged (see application Ser. No. 15/798,658 which is incorporated herein by reference and now issued as U.S. Pat. No. 9,865, 153). At least one of the male connector and the female connector of the USB extension cable may be further equipped with a GPS device for positioning.

One of the sides of the female end of the USB cable may have an actuation button (5206) and a corresponding portion of the sheath has an opening (5208) that surrounds the actuation button (5206). See also FIG. 44, wherein one of the sides of the female end of the USB cable has an actuation button and the corresponding side of the sheath has an corresponding button (4401) communicating with the top of the actuation button.

As shown in FIGS. 56, 57, 58, 29, 60 and 61 the raised portion may take many different shapes. The sheath having a raised portion that is selected from the group consisting of dome shaped (5600), raised circular shape (5700), raised semi-circular shape (5800), raised rectangular shape (6000), raised square shape and raised polygon shape (6100 and 5900) that extends above an outer surface of a body, wherein the raised portion has a USB opening, and a surrounding bottom portion surrounding at least a portion of the raised portion, wherein the body has an inner surface, an outer surface and a body opening between the inner surface and the outer surface; wherein the sheath is at the body opening with the raised portion above the outer surface and at least a portion of the surrounding bottom portion is in communication with a portion of the body, and wherein the sheath has a female end of a USB cable in the USB opening, wherein the female end of the USB cable has four sides, an operative end and a cord end and the operative end of the female end of the USB cable is retained in the USB opening to provide the female end of the UBS cable in a flat position with the operative end of the female connector being uncovered and above the outer surface of the body.

The specific embodiments above are only detailed explanation on the technical solutions of the utility model, and the utility model is not limited only by the embodiments above. Any improvement or replacement based on the principle of the utility model shall be within the protection scope defined in claims of the utility model.

I claim:
1. A sheath for convenient charging, comprising:
a sheath having a left side, a right side and a top side, a first closed end, a second open end and a surrounding bottom portion surrounding at least a portion of one of the left side, the right side, the top side, the first closed end and the second open end of the sheath,
wherein at least a portion of the sheath extends above an outer surface of a body, wherein the body has an inner surface, an outer surface and an opening between the inner surface and the outer surface;
wherein the sheath is at the opening and the sheath receives a female end of a USB cable having four sides, an operative end, a cord end and a cord, wherein the operative end of the female end of the USB cable is retained in the second open end of the sheath and the cord end of the female end of the USB cable is retained in the first closed end of the sheath to provide the female end of the UBS cable in a flat position with the operative end of the female connector being uncovered and above the outer surface of the body, wherein the cord of the female end goes through the opening between the inner surface and the outer surface and the surrounding bottom portion is attached to a portion of the body.

2. A sheath as in claim 1, wherein the body has an opening between the inner surface and the outer surface and the surrounding bottom portion is attached to the inner surface of the body.

3. A sheath as in claim 1, further comprising an external USB connecting line having a male end, wherein the male end of the external USB connecting line is plugged into the operative end of the female end of the USB cable.

4. The sheath as in claim 1, wherein the body is selected from the group consisting of luggage, bag, gloves, activewear, jacket, socks, shoes, hats, glasses, goggles and belt.

5. The sheath as in claim 1, further comprising a second outer surface that covers the outer surface of the body.

6. The sheath as in claim 1, wherein the sheath has at least one ventilation opening on at least one of the at least three sides of the water proof sheath.

7. The sheath as in claim 1, wherein the at least one ventilation opening is along the second open end of the sheath.

8. The sheath as in claim 1, further comprising an attachment portion that extends around a bottom portion of the sheath and is in communication with the inner surface of the body.

9. The sheath as in claim 8, wherein the piece of fabric entirely covers the opening between the inner surface and the outer surface and has an opening for the USB cable.

10. The sheath as in claim 1, further comprising a piece of fabric in communication with the inner surface of the body and retaining at least the operative end of the female end of the USB cable in the sheath.

11. The sheath as in claim 10, wherein the piece of fabric is selected from the group consisting of a reinforced piece of fabric, elastic material and ribbon.

12. The sheath as in claim 1, further comprising a rigid cover in communication with the inner surface of the body and retaining at least the operative end of the female end of the USB cable in the sheath.

13. The sheath as in claim 1, further comprising a dust cap attached to the sheath, wherein the dust cap is movable to cover and uncover the operative end of the female connector.

14. The sheath as in claim 1, wherein at least one of a male connector of a USB extension cable and the female connector of the USB extension cable is further equipped with a wireless technology standard for exchanging data over short distances as an anti-loss alarm, which is used to connect to the device on the product to be charged.

15. The sheath as in claim 1, wherein at least one of the male connector and the female connector of the USB extension cable is further equipped with a GPS device for positioning.

16. The sheath as in claim 1, wherein the first closed end is tapered and the sheath tapers down from the four sides to the first closed end.

17. The sheath as in claim 1, wherein the sheath has four sides with a bottom side having a bottom side opening to allow the female end of the USB cable to sit in the sheath and the cord of the USB to go through the bottom side opening.

18. The sheath as in claim 1, wherein the outer surface of the body is the inside of a pocket.

19. The sheath as in claim 1, wherein the sheath is attached to the body with the first closed end above the second open end.

20. The sheath as in claim 1, further comprising a piece of material attached to at least one of a portion of the inner surface of the body and a portion of the surrounding bottom portion to retain the operative end of the female end of the USB cable in the sheath.

21. The sheath as in claim 1, wherein the surrounding bottom portion is a flat portion.

22. The sheath as in claim 1, wherein the body is provided with a cable laying channel from a power storage device placing space to the opening for the penetration of the USB extension cable.

23. A sheath for convenient charging, comprising:
a sheath having a raised portion that extends above an outer surface of a body, wherein the raised portion has a USB opening, and a surrounding bottom portion surrounding at least a portion of the raised portion,
wherein the body has an inner surface, an outer surface and a body opening between the inner surface and the outer surface;
wherein the sheath is at the body opening with the raised portion above the outer surface and at least a portion of the surrounding bottom portion is in communication with a portion of the body,
wherein the sheath has a female end of a USB cable in the USB opening, wherein the female end of the USB cable has four sides, an operative end and a cord end and the operative end of the female end of the USB cable is retained in the USB opening to provide the female end of the UBS cable in a flat position with the operative end of the female connector being uncovered and above the outer surface of the body.

24. A sheath as in claim 23, wherein the raised portion is selected from the group consisting of dome shaped, raised circular shape, raised semi-circular shape, raised rectangular shape, raised square shape and raised polygon shape.

* * * * *